June 25, 1963
F. G. SCHULTZ
3,095,130
ROLL FEED DEVICE
Original Filed Feb. 8, 1960
2 Sheets-Sheet 1
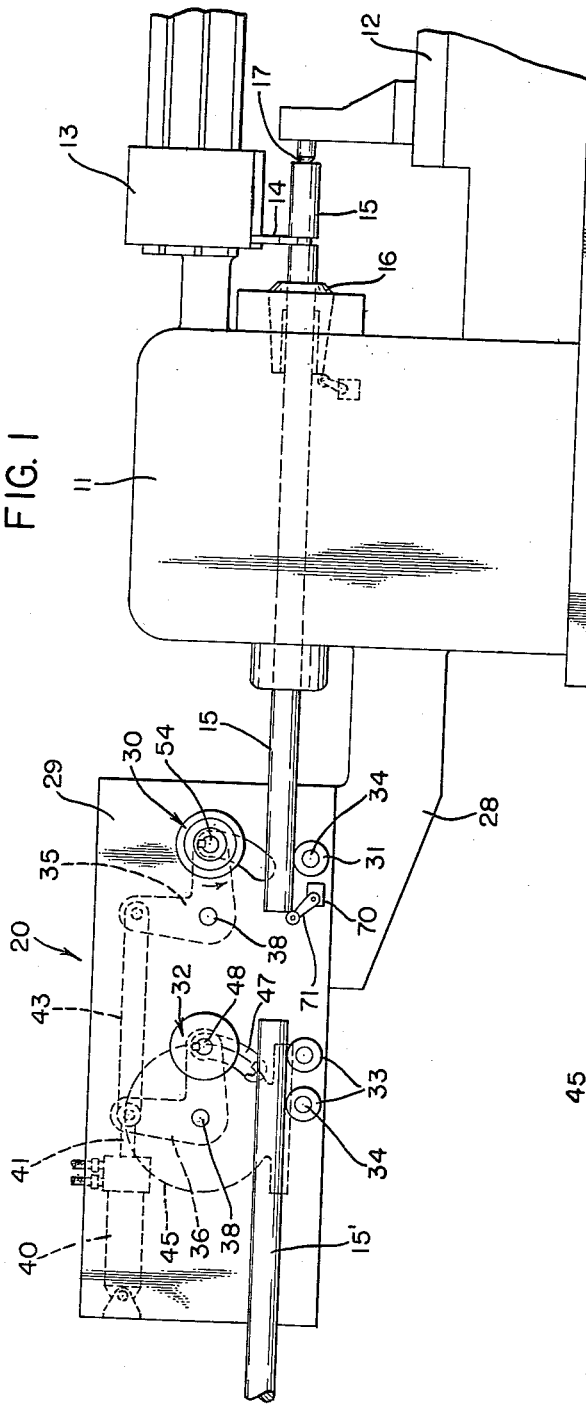
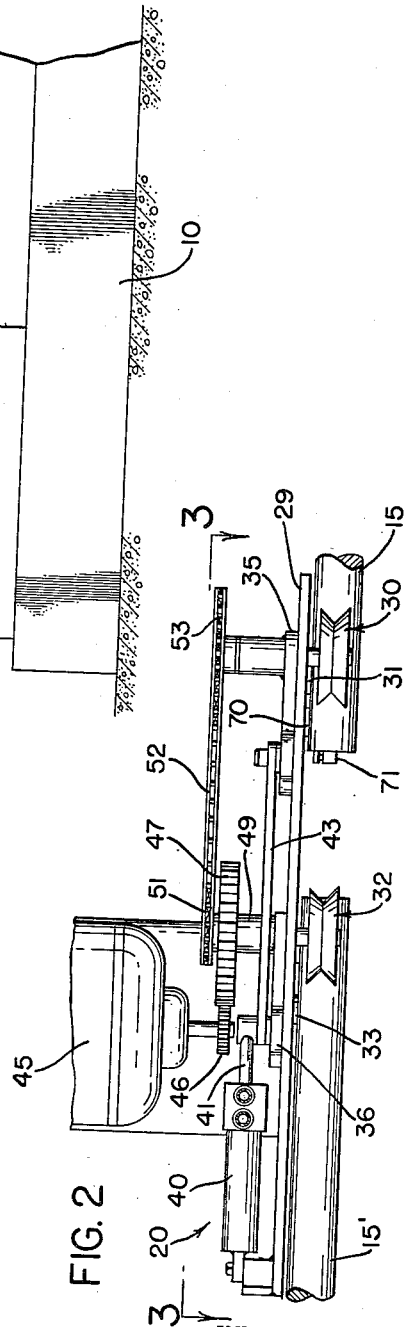
INVENTOR.
FRANKLIN G. SCHULTZ
BY Alfred C Body
ATTORNEY June 25, 1963 F. G. SCHULTZ 3,095,130
ROLL FEED DEVICE
Original Filed Feb. 8, 1960 2 Sheets-Sheet 2
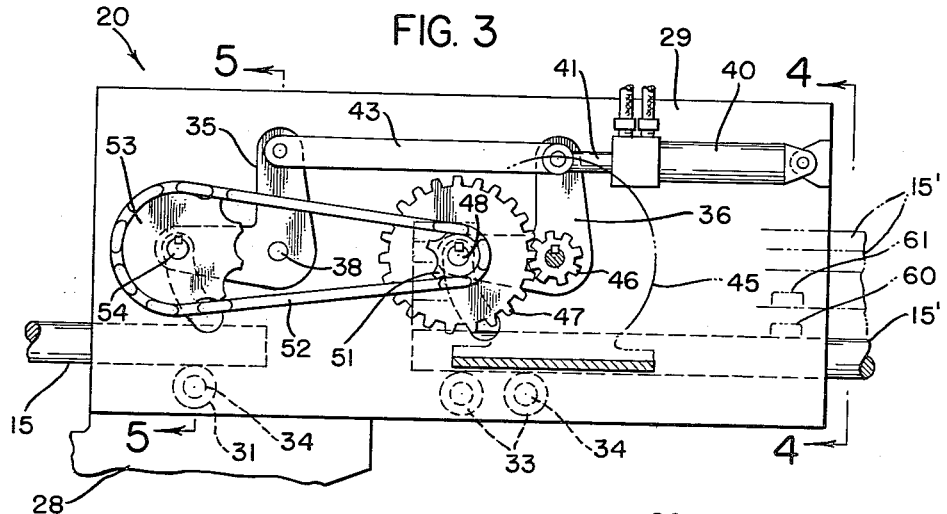
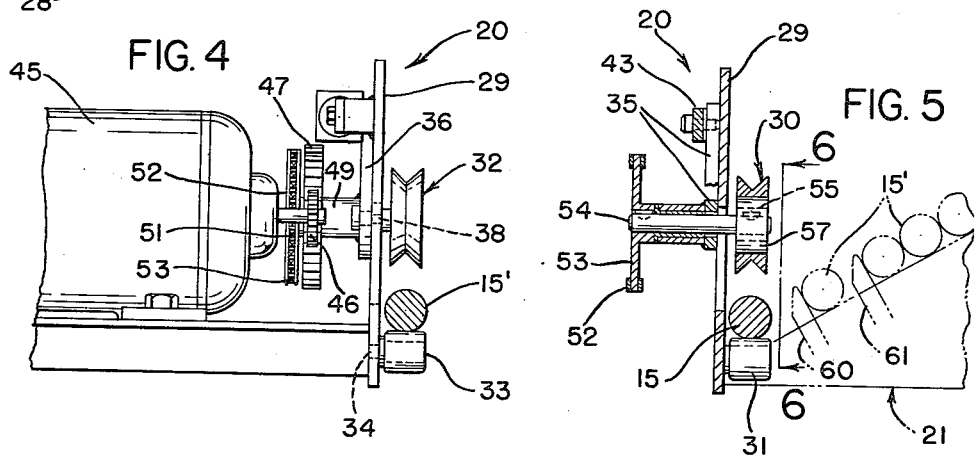
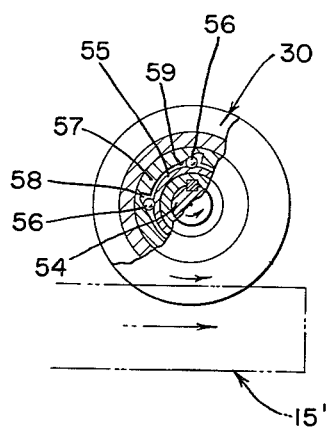
INVENTOR.
FRANKLIN G. SCHULTZ
BY Alfred C Body
ATTORNEY

United States Patent Office 3,095,130
Patented June 25, 1963

3,095,130
ROLL FEED DEVICE
Franklin G. Schultz, 13109 Broadway, Cleveland 25, Ohio
Continuation of application Ser. No. 7,492, Feb. 8, 1960
This application Jan. 24, 1961, Ser. No. 84,624
6 Claims. (Cl. 226—108)

This invention pertains to the art of machine tools, and more particularly to apparatus for feeding lengths of bars or bar stock into a machine tool.

The invention is particularly applicable to the feeding of bar stock to automatic screw machines and will be described with particular reference thereto, although it will be appreciated that the invention has other and broader applications.

This application is a continuation of my co-pending application Serial No. 7,492, filed February 8, 1960, now abandoned.

In the art of screw machines, a power driver chuck or collet holds and rotates a projective length of bar stock while it is being machined to the desired shape. When the shape is completed, it is cut off from the bar and the bar must then be longitudinally advanced to bring a new portion thereof into machining position. It is conventional to provide a pair of grooved power driven rolls close to the collet which engage the bar stock and advance it lengthwise through the chuck against a stop and the new machining position.

When one bar is used up, a new one must be supplied. The new bars are usually dropped into spaced, but longitudinal, alignment with the drive rolls one at a time from a magazine, and are then advanced longitudinally into the drive rolls by apparatus provided which pushes against the trailing or rear end of the bars. Such apparatus, although cumbersome, has been satisfactory except where the individual bars may have varying lengths or where the length of the bars may vary from day to day. In such instances, it is necessary to change the apparatus to compensate for such changes in length.

The present invention contemplates new and improved apparatus which overcomes these objections and provides apparatus for feeding bar stock into a machine tool which is simple in construction, positive in operation, economical to manufacture and which automatically takes care of bar stocks of any varying length.

In accordance with the present invention, two tandem and aligned pairs of drive rolls are provided close to the chuck, one pair, the closest to the chuck, functioning as heretofore, and the other pair close to but on the side of the first pair remote from the chuck acting to advance new bar stock longitudinally into position to be acted on by the close pair. The magazine from which new bars are supplied is then arranged so that new bars may move sideways from the magazine into alignment with the two pairs of drive rolls with the front end between the two pairs of drive rolls such that when the remote pair of drive rolls is actuated, they will advance the new bar longitudinally into operative relationship with the close pair of drive rolls.

Further in accordance with the invention, the remote pair of drive rolls are arranged to advance the bar at a greater longitudinal speed than that of the close pair of drive rolls so that the front end of a new bar will quickly come into abutting engagement with the trailing end of the old partly machined bar.

Further in accordance with the invention, the close pair of drive rolls is driven through an over-running clutch such that as the remote pair of drive rolls advances the bar longitudinally faster than the close pair of drive rolls would advance the bar, the bar may advance at such faster rate without being scored or scratched by the close pair of drive rolls.

The principal object of the invention is the provision of new and improved apparatus for feeding bar stock into a machine tool which overcomes all of the objections of the prior art which is simple in construction, economical to manufacture and which will handle without modification, bars of varying lengths.

Another object of the invention is the provision of a new and improved bar stock feeding apparatus comprised of two tandem pairs of drive rolls, each located close to the chuck of the machine tool, the pair closest to the chuck being arranged to advance the bar stock into the chuck, and the other being arranged to advance the bar stock into the first pair of drive rolls.

Another object of the invention is the provision of a new and improved arrangement for feeding bar stock into a machine tool including two sets of tandem drive rolls, one being arranged to drive the bar stock at a speed faster than the other.

Another object of the invention is to provide a novel, desirable and satisfactory feeding mechanism for metal cutting machines of the kind whereby lengths of stock regardless of variations in length, may be fed end-to-end into the machine and each length of bar stock fed intermittently to match the cycle of the machine and in such portions of the total stock length as required by the machine.

Another object of the invention is the provision of a new and improved apparatus for feeding bar stock into a machine tool including a pair of non-synchronously driven tandem mounted drive rolls capable of positively engaging the bar stock for the purpose of maintaining friction driving contact therewith to advance into the machine a sufficient amount.

Another object of the invention is the provision of a new and improved apparatus for feeding bar stock into a machine tool including drive rolls which engage the bar stock to advance it into the machine and then disengage the bar stock to allow the bar stock to revolve for machining purposes, and which also includes means for receiving new lengths of bar stock fed at a right angle to the longitudinal axis of the stock from a magazine and thence into the drive rolls.

Another object of the invention is the provision of a new and improved mechanism for feeding bar stock into a machine tool whereby the drive rolls may revolve constantly and the drive rolls may be readily moved into and out of driving contact with lengths of bar stock.

Another object of the invention is the provision of a new and improved apparatus for feeding bar stock into a machine tool including two tandem mounted drive rolls revolving at dissimilar speeds, the slower revolving drive rolls containing an over-running clutch which allows bar stock to be advanced through such drive rolls under the influence of, and at a speed controlled by the faster revolving drive roll.

The invention may take physical form in certain parts and arrangements of parts, a preferred embodiment of which will be described in detail in this specification and illustrated in the accompanying drawing which forms a part hereof and wherein:

FIGURE 1 is a front elevational view of a conventional screw machine having mounted thereon bar feeding apparatus illustrating a preferred embodiment of the invention, the view of FIGURE 1 showing the drive rolls out of driving engagement with the bar stock;

FIGURE 2 is an enlarged top plan view of the bar stock feeding mechanism of FIGURE 1;

FIGURE 3 is a view of the bar stock feeding apparatus of FIGURE 1, but viewed from the opposite side, the view being taken approximately on the line 3—3 of FIGURE 2 and showing schematically location of the magazine and bar stock therein;

FIGURE 4 is a cross-sectional view of FIGURE 3 taken approximately on the line 4—4 thereof;

FIGURE 5 is a cross-sectional view of FIGURE 3 taken approximately on the line 5—5 thereof and showing schematically the magazine of FIGURE 3;

FIGURE 6 is an enlarged view of FIGURE 5 taken approximately on the line 6—6 of FIGURE 5 and showing details on the over-running clutch thereof.

Referring now to the drawings wherein the showings are for the purposes of illustrating a preferred embodiment of the invention only and not for the purposes of limiting same, FIGURE 1 shows a more or less conventional metal cutting machine comprised of a base 10, a head stock 11, a bed 12 and an arbor 13 which supports various cutting tools 14 and brings them into contact with the bar stock 15 to effect various machining operations thereon as it is rotated by mechanism (not shown) within the head stock 11. A chuck or collet 16 holds and rotates the bar stock 15. The bar stock 15 is advanced from left to right through the head stock 11 and collet 16 into engagement with a fixed stop 17 mounted on the bed 12 by means of the feed mechanism 20 which forms the subject matter of the present invention.

This feed mechanism 20, as will appear, accepts lengths of new bar stock 15' from a magazine 21 (see FIGURE 5) and advances it into the head stock. For the purposes of clarity, bar stock already in the machine tool will be referred to as "old bar stock" and bar stock which is either in the magazine or is being advanced initially into the machine tool will be referred to as "new bar stock."

The bar stock 15 may have any desired cross-sectional shape, but in the embodiment of the invention shown, is generally cylindrical. Obviously, the bar stock may be of any known machinable material, e.g., steel, brass or the like.

In operation the bar stock 15 is gripped by the chuck 16 during the machining operation, which chuck 16 releases as the old bar stock 15 is advanced further into the screw machine after the piece being machined is cut off and a new machining cycle is to commence and then regrips the advanced bar stock. The distance the bar stock 15 will be advanced at the end of each cycle or the beginning of each new cycle, will depend upon the length of the piece being machined, which will in many ways be determined by the distance of the cutoff tool from the stop 17.

The apparatus 20 for feeding the bar stock 15 into the machine tool is comprised of a face plate 29 mounted on the left hand end of the head stock 11 by means of a bracket 28. The feed apparatus per se is comprised of a first drive roll 30 and a second drive roll 32. Opposite each of these rolls 30 and 32 are idler rolls 31, 33 mounted for free rotation on the base plate 29 by means of a stub shaft 34. These rolls 31, 33 may be ball bearing equipped, if desired.

The drive rolls, 30, 32 are each mounted for movement towards and away from their respective idler rolls 31, 33 by means of a pair of bell cranks 35, 36 respectively pivoted on the base plate 29 by means of shafts 38. These bell cranks 35, 36 are in turn rotated about the shafts 38 by means of a hydraulic cylinder 40 reciprocably mounting a piston and piston rod 41, the outer end of which is pivoted to the end of the bell crank 36 opposite from the drive roll 32. A connecting rod 43 connects the corresponding ends of the bell cranks 35, 36 and causes the two bell cranks to move in unison. Obviously, as the piston rod 41 moves to the right and left, the opposite end of the bell cranks 35, 36 will move in a generally vertical direction to bring the drive rolls 30, 32 into and out of engagement with the bar stock 15.

The drive rolls 30, 32 are continuously rotated by means of an electric motor 45 through a suitable speed reducing arrangement such as a gear 47 keyed to a shaft 48 which in turn is journaled in a bushing 49 fastened to the vertically movable end of the bell crank 36 and which shaft in turn is keyed to the drive roll 32. The drive roll as viewed in FIGURE 1 is continuously driven in a counterclockwise direction such that when the drive roll 32 is brought into engagement with a new bar stock 15', the bar stock will be clamped between the roll 32 and the idler rolls 33 and advanced from left to right at a speed equal to the peripheral speed of the roll 32. So long as the roll 32 remains in engagement with the new bar stock 15', a force will be created urging it from left to right.

In accordance with the invention, the axis of the gear 46 is aligned with the axis of the shaft 38. Thus, the motor 45 may continuously rotate the drive wheel 32 and yet the drive wheel 32 may be moved in a vertical direction by rotating the bell crank 36 without interruption in the speed of rotation of the drive roll 32.

In accordance with the invention, the drive roll 30 has a peripheral speed less than the peripheral speed of the drive roll 32. This may be accomplished in a number of different manners, for example, by rotating the two rolls at the same speed, but making the diameter of the roll 30 less than the diameter of the roll 32, but in accordance with the preferred embodiment of the invention, the two rolls 30, 32 are of the same diameter and the roll 30 is rotated at a speed less than that of the roll 32. In the embodiment of the invention shown, a chain sprocket 51 is keyed to the shaft 48 and drives a chain 52 around a sprocket 53 keyed to a shaft 54 supported in a bushing on the vertically movable end of the bell crank 35.

It will thus be appreciated that the drive roll 32 will tend to drive new bar stock 15' into the machine tool at a speed faster than that of the drive roll 30. In accordance with the invention, means are provided for allowing the drive roll 30 to be rotated at a speed faster than that of the shaft 54. This may be accomplished in a number of different manners, but in the embodiment of the invention shown, an over-running clutch is provided comprised of an inner race 55 keyed to the shaft 54 and having a plurality of indentations in its outer surface in which ball bearings 56 are disposed. An outer race 57 surrounds the inner race 55 and the ball bearings 56 and has grooves 58 in its inner surface defined in part by generally tangential surfaces 59. These surfaces wedge on the balls 56 when the shaft 54 tends to rotate at a speed faster than the drive roll 30 so as to drive the roll 30. On the other hand, if the drive roll 30 tends to rotate faster than the shaft 54, the wedging action on the balls 56 is released and the drive roll 30 may then freely rotate at such greater speed. It will be appreciated that this action will result whenever the drive roll 32 is advancing a new bar stock 15' in abutment with the left hand or trailing end of old bar stock 15.

FIGURE 5 shows a magazine 21 having movable stops 60, 61 which operate alternately to allow new bar stock 15' to be advanced in a direction transverse to its longitudinal length into a position where it can be fed longitudinally into the machine tool.

This magazine and the intermittent feed mechanism forms no part of the present invention and will not be described further herein other than to state that the magazine is so arranged that the forward or leading end of new bar stock 15' will lie in a plane intermediate between the two rolls 30, 32.

A limit switch 70 mounted on the base plate 29 has an arm 71 for sensing when the trailing end of an old bar stock has advanced to the point where it is time to feed a new bar stock into the machine.

In operation, whenever the limit switch 70 senses that the trailing end of an old bar stock has passed to the right beyond the feed roll 32, suitable mechanism (not shown)

is activated to operate the stops 60, 61 in the magazine 21 to advance a new bar stock 15' into alignment with the old bar stock 15 and such that the leading end of the new bar stock 15' is in a position to be gripped between the drive roll 32 and the idler roll 33. This mechanism is timed to only operate when the rolls 30, 32 are in the retracted position away from the bar stock.

As soon as the cycle of the machine calls for the old bar stock 15 to be again advanced into the machine tool, the cylinder 40 is actuated to move the piston 41 from left to right as viewed in FIG. 1. Such action advances both drive rolls 30, 32 into pressure friction engagement with the trailing end of the old bar stock 15 and the leading end of the new bar stock 15' respectively.

The periphery of the drive roll 32 is moving at a speed greater than the periphery of the drive roll 30 and the new bar stock 15' is moved at a speed greater than the speed of the old bar stock 15 such that its leading end comes into abutting engagement with the trailing end of the old bar stock. At this point, the new bar stock 15' will push the old bar stock 15 at a speed faster than the drive roll 30 is rotating. This action is permitted by virtue of the over-running clutch through which the drive roll 30 is driven by the motor 45 and the chain and sprocket arrangement 51, 52, 53.

As soon as the leading end of the old bar stock 15 engages the stop 16, the cylinder 40 is energized in the opposite direction to withdraw the piston 41 and move the drive rolls 30, 32 out of friction engagement with the new and old bar stock.

With the arrangement just described, it will be appreciated that the length of the new bar stocks in the magazine are immaterial to the successful operation of the apparatus. Either bar stocks of mixed lengths or of uniform lengths which may vary from day to day, may be employed with equal success.

The invention has been described with reference to a preferred embodiment. Obviously, modifications and alterations will occur to others upon a reading and understanding of this specification, and it is my intention to include all such modifications and alterations insofar as they come within the scope of the appended claims.

Having thus described my invention, I claim:

1. Apparatus for feeding bar stock into the entrant end of a machine tool comprising in combination: a pair of drive rolls in aligned tandem relationship longitudinally relative to the bar stock, each of said rolls being movable transversely of the length of said bar stock into and out of frictional engagement therewith, means rotating each of said drive rolls with the peripheral speed of said drive roll remote from said machine tool being greater than the peripheral speed of said drive roll closest to said machine tool, the means driving said last mentioned roll including an over-running clutch whereby said remote drive roll may advance bar stock through said close drive roll into said machine tool at a rate greater than the normal driven peripheral speed of said close drive roll.

2. Apparatus for feeding bar stock into a machine tool comprising in combination: a base, a pair of bell cranks each pivotally mounted on parallel axes on said base, a drive roll mounted on one end of each bell crank, said rolls being in tandem relationship, power means operatively associated with the opposite end of each bell crank for simultaneously moving said rolls into and out of engagement with bar stock, power means for simultaneously rotating each of said drive rolls, one of said drive rolls having a lesser peripheral speed than the other and means permitting said drive roll of lesser speed to be moved at a greater speed as said drive roll of greater speed advances bar stock past said drive roll of lesser speed.

3. An apparatus for feeding bar stock into the entrant end of a machine tool, comprising in combination: a pair of drive rolls in aligned tandem relationship longitudinally relative to said bar stock, means for moving said drive rolls transversely of the length of said bar stock into and out of frictional engagement therewith, means for rotating each of said drive rolls with the peripheral speed of said drive roll remote from said machine tool being greater than the peripheral speed of said drive roll close to said machine tool, and means on said close drive roll for allowing greater peripheral speed than its driven speed.

4. In an apparatus as defined in claim 3 including coordinating means for maintaining constant spacing between said drive rolls as said drive rolls are moved transversely of the length of said bar stock.

5. In an apparatus as defined in claim 4 wherein said coordinating means comprises a pair of identical bell cranks each having an arm rotatably mounting one of said drive rolls equidistant from the rotational axis of said bell crank and means for rotating said bell cranks in unison so that a constant distance is maintained between said rolls as they are moved into frictional engagement with said bar stock.

6. In an apparatus for feeding bar stock into the feed end of a machine tool and including a first drive roll arranged to intermittently engage the bar stock and advance same in a feed direction, the improvement which comprises: a second drive roll on the side of said first drive roll remote from said machine tool and arranged to engage a new length of bar stock and advance it into feed engagement with said first drive roll, said drive rolls being mounted for simultaneously moving into driving engagement with said stock, means for continuously rotating both of said drive rolls with said second drive roll being driven at a peripheral speed greater than said first drive roll and said first drive roll being driven through an over-running clutch whereby bar stock driven by said second drive roll may move past said first drive roll at a speed greater than the driven speed of said first drive roll.

References Cited in the file of this patent

UNITED STATES PATENTS

| | | |
|---|---|---|
| 1,385,468 | Pflanze | July 26, 1921 |
| 2,655,066 | Siegerist | Oct. 13, 1953 |
| 2,957,574 | Compton | Oct. 25, 1960 |